United States Patent [19]

Chow et al.

[11] Patent Number: 4,991,476
[45] Date of Patent: Feb. 12, 1991

[54] AUTOMATIC KNIFE SHARPENING METHOD FOR FORAGE HARVESTERS

[75] Inventors: Mark K. Chow, Paoli; John R. McClure, New Holland, both of Pa.

[73] Assignee: Ford New Holland, Inc., New Holland, Pa.

[21] Appl. No.: 486,213

[22] Filed: Feb. 8, 1990

[51] Int. Cl.$^5$ .................. B24B 19/00; B26D 1/00
[52] U.S. Cl. .......................... 83/13; 83/174; 83/522.12; 51/249; 241/101.2
[58] Field of Search .............. 241/101.2, 101.7; 51/246, 247, 249, 250, 252; 283/13, 174, 522.12

[56] References Cited

U.S. PATENT DOCUMENTS

4,192,103  3/1980  Sousek et al. ........................ 51/249
4,834,303  5/1989  McClure et al. .................. 241/101.2

Primary Examiner—W. Donald Bray
Attorney, Agent, or Firm—Griffin, Branigan & Butler

[57] ABSTRACT

In a forage harvester having a motor driven sharpening stone driven back and forth along a path parallel to the axis of a rotating cutterhead to sharpen the knives of the cutterhead, and a door which normally prevents access to the knives, a control circuit is provided for controlling the opening of the door, the movement of the sharpening stone to sharpen the knives, and the closing of the door after the knives have been sharpened. The circuit is controlled by switches located at an operator's control panel and accessible to the operator while he is in the driver's seat of the harvester so that the operator does not have to leave his driving position to accomplish the knife sharpening operation. The circuit includes visual indicators located on the control panel for indicating the status of the circuit during the entire operation. The circuit includes a sensor circuit for sensing the rate of rotation of the cutterhead, the sensor circuit preventing knife sharpening from taking place unless the cutterhead is rotating at a rate greater than the rate required for proper sharpening of the knives.

10 Claims, 6 Drawing Sheets

AUTOMATIC KNIFE SHARPENING METHOD FOR FORAGE HARVESTERS

This invention relates to a novel method and apparatus for automatically controlling the sharpening of cutterhead knives in a forage harvester. The invention provides improvements in cutterhead knife sharpening systems of the type disclosed in U.S. Pat. No. 4,834,303, the disclosure of which is incorporated herein by reference.

In our U.S. Pat. No. 4,834,303 we disclose a knife sharpening apparatus for sharpening the cutterhead knives in a forage harvester. The apparatus disclosed therein includes a sharpening stone that is driven back and forth adjacent a rotating cutterhead to sharpen the knives thereof, the knives traversing a path which defines a cylinder. A control circuit is provided so that an operator may control the sharpening operation by operating switches in the cab of the forage harvester. However, as disclosed in the patent, the operator must first get out of the cab and manually turn a crank to open an access door, then return to the cab to initiate and control the knife sharpening operation and, after the sharpening operation is completed, again get out of the cab to close the access door. In the patent we suggest that the access door may be driven by a motor controlled from the operator's cab, but we disclose no circuitry for interlocking the door operations with the knife sharpening operations, an essential consideration since the sharpening stone traverses a path such that it would collide with the door if the door is not open.

The knife sharpening system disclosed in our aforementioned patent is operable regardless of the rate of rotation of the cutterhead knives. Since the sharpening stone is controlled to sharpen the knives for a fixed interval of time, incomplete sharpening may occur if the cutterhead is rotating at too slow a speed. Therefore, in production models of forage harvesters incorporating the invention disclosed in our patent, an electrical interlock is provided which prevents initiation of the knife sharpening operation unless the harvester engine speed is greater than some predetermined value. For example, in the Ford New Holland Model 1915, engine speed is sensed and fed to a microprocessor. However, because a clutch is located between the engine and the cutterhead, it is also necessary to sense the condition of the clutch to insure that the cutterhead is rotating and this signal must also be provided as an input to the microprocessor. By sensing cutterhead speed rather than engine speed it is thus possible to eliminate one input to the microprocessor.

SUMMARY OF THE INVENTION

An object of the present invention is to provide an automatic knife sharpening system for a forage harvester, the system having a control circuit which permits the operator to control the opening of an access door and the operation of a sharpening stone from the operator's cab, the control circuit preventing movement of the sharpening stone unless the access door is fully opened.

An object of the present invention is to provide a control circuit for an automatic knife sharpening system, and sensing means for sensing cutterhead speed, the control system being responsive to the sensing means for inhibiting initiation of a knife sharpening operation if the cutterhead speed is less than a desired speed, and responsive to the sensing means for terminating a knife sharpening operation when the cutterhead speed drops below the desired speed.

An object of the present invention is to provide a novel method of controlling cutterhead knife sharpening in a forage harvester, said method comprising sensing cutterhead speed, inhibiting initiation of a knife sharpening operation when the cutterhead speed is less than a desired speed, and terminating a knife sharpening operation when the cutterhead speed drops below the desired speed.

The above-stated objects are accomplished by providing a bi-directional motor for driving an access door to a fully opened position or a fully closed position, first and second switches actuated by the door when it is fully closed and fully opened, respectively, and first and second relays controlled through the first and second switches, for driving the motor in a first or a second direction. A sharpening stone drive motor is provided for driving a sharpening stone along a path to sharpen the knives of a cutterhead, and a switch is provided for sensing when the sharpening stone is at a home/park position which is out of the path of the access door. The arrangement of the circuit is such that the sharpening stone drive motor cannot be energized except when the access door is fully opened, and the bi-directional motor cannot be energized to close the access door except when the sharpening stone is in its home/park position. A sensor means senses the speed or rate of rotation of the cutterhead. When the speed is below a predetermined value the operation of the sharpener drive motor is terminated immediately if the sharpening stone is in its home/park position, but if the sharpening stone is not in its home/park position the motor remains energized until the sharpening stone reaches its home/park position.

Other objects of the invention and its mode of operation will become apparent upon consideration of the following description and the accompanying drawings.

DETAILED DESCRIPTION OF THE PREFERRED EMBODIMENT

FIGS. 1–5 illustrate a forage harvester and knife sharpening system as disclosed in U.S. Pat. No. 4,834,303. The forage harvester comprises a main frame 1 on which are mounted ground-engaging wheels 2 and 3 and which is fitted with a corn header 4 (shown in phantom). The forage harvester includes upper and lower forward feed rolls 5 and 6 followed by upper and lower rear feed rolls 7 and 8 which operate to feed crop material from the header 4 into a conventional cutterhead 9, the knives 10 of which cooperate with a fixed shearbar 11 fitted on the lower edge of a cutterhead inlet opening. The outlet of the cutterhead housing communicates with the inlet of a blower 12, the outlet of which is fitted with the normal discharge spout 13 which can be positioned by the operator to direct the cut crop material as required, normally into a wagon which is moving alongside the harvester or in some instances is pulled behind the harvester.

The cutterhead 9 is fitted with a knife grinding or sharpening mechanism, indicated generally at 14, the main components of this device including a solid cylindrical grinding or sharpening stone 15 adjustably mounted within a barrel 16 which is externally threaded and is received by a threaded aperture in a carriage 17 for the sharpening stone. The upper end of the barrel 16 is fitted with a toothed indexing ring 18 and an aperture is provided through the carriage 17, the aperture being threaded for receiving a threaded rod 19 fitted with a handle 20. The rod 19 acts, via a spring 21, (FIG. 5) upon a plastic insert 22 and presses it into engagement with the external threads of the barrel 16. When the spring 21 is suitably compressed by rotating the rod 19 using the handle 20, the insert 22 is pressed on to the barrel threads so as to prevent inadvertent rotation of the barrel 16. The action of the insert 22 is such that it prevents inadvertent movement of the barrel 16 due to vibration but in no way prevents the rotation of the barrel 16 as a result of the operation of the indexing mechanism for the stone 15 which is effected after every two strokes of the stone or carriage 17 relative to the cutterhead 9. The indexing mechanism comprises the indexing ring 18 and a trip device 23 (FIG. 3) which is mounted on one of the guide rails for the carriage 17. As the toothed ring 18 engages the trip member 23 every two strokes of the carriage 17, the ring 18, and hence the barrel 16, is rotated substantially one tooth width and thus the stone 15 is moved downwardly by a small distance relative to the cutterhead 9 so as to compensate for wear of the stone during the sharpening or grinding action of the last two strokes of the mechanism.

Figure 3:
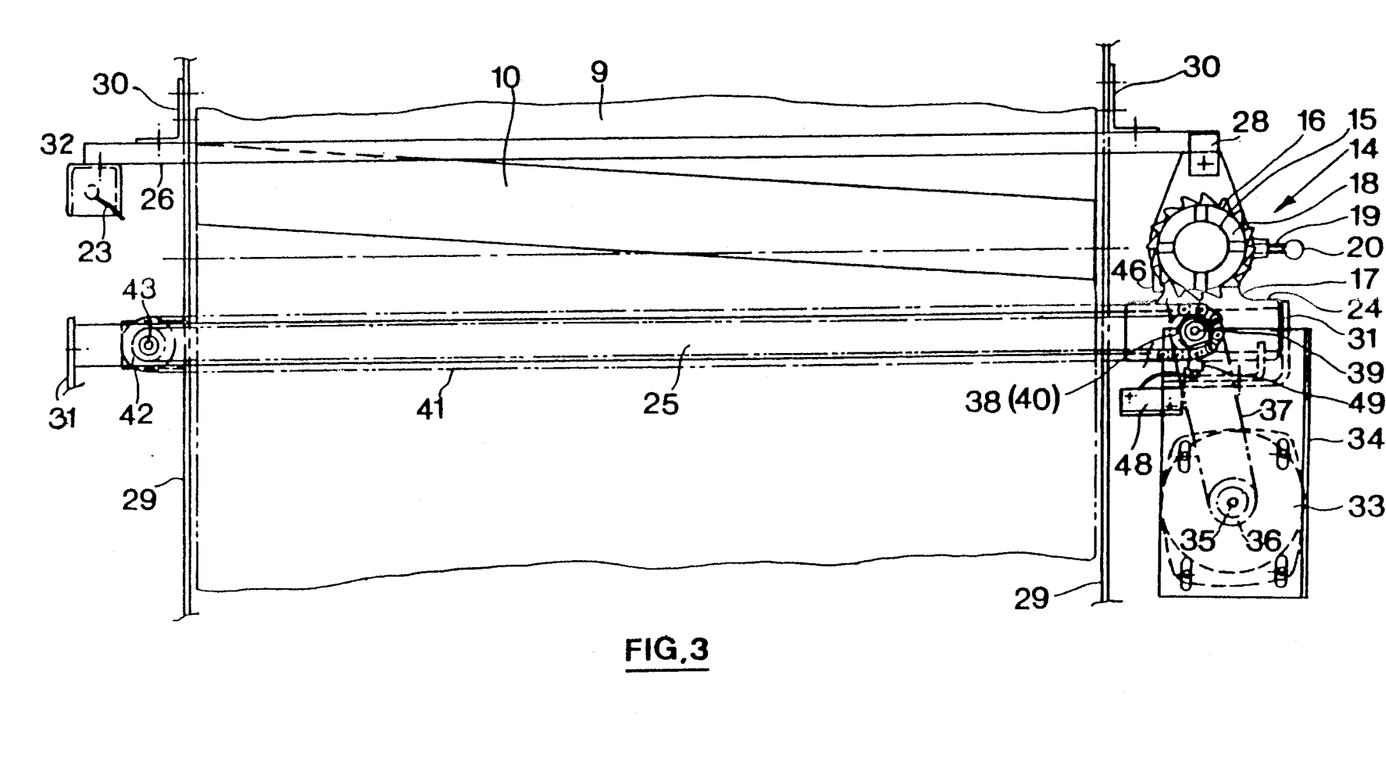
FIG. 3 is a view in the direction of arrow III of FIG. 2 in reduced scale.
Figure 4:
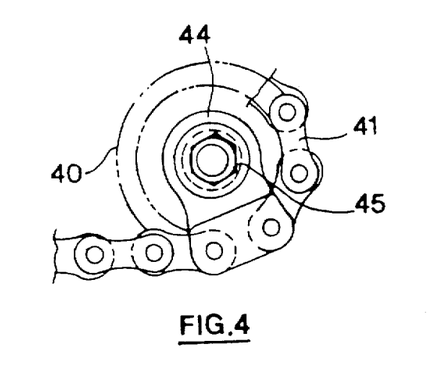
FIG. 4 is a sectional view taken along line IV—IV of FIG. 2.
Figure 5:
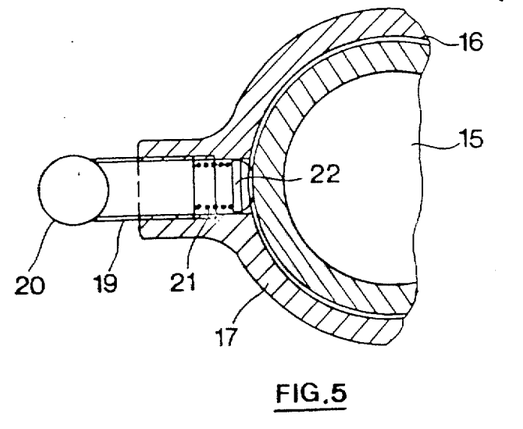
FIG. 5 is a sectional view taken along line V—V of FIG. 2.

The carriage 17 has a collar 24 which receives a guide rod 25 of circular cross-section via bearings (not shown) which facilitate movement of the carriage back and forth along this guide rod. A second guide 26 in the form of a rail or strip of metal of rectangular cross-section is provided and a roller 27 is provided on the carriage 17 to engage the underside of the guide rail 26. A guide plate 28 is provided on the carriage 17 and slidably engages the top of the guide rail 26. A circular guide rod 25 with a rectangular guide rail 26 is used so as to accommodate any manufacturing tolerances or misalignments due to wear. The rectangular guide rail 26 is mounted on the sidewalls 29 of the cutterhead housing by respective L-shaped brackets 30, whereas the circular guide rod 25 is mounted on L-shaped brackets 31 attached to the side walls 29. As shown in FIG. 3, the trip mechanism 23 is mounted on a support 32 which is attached to the guide rail 26.

Figure 2:
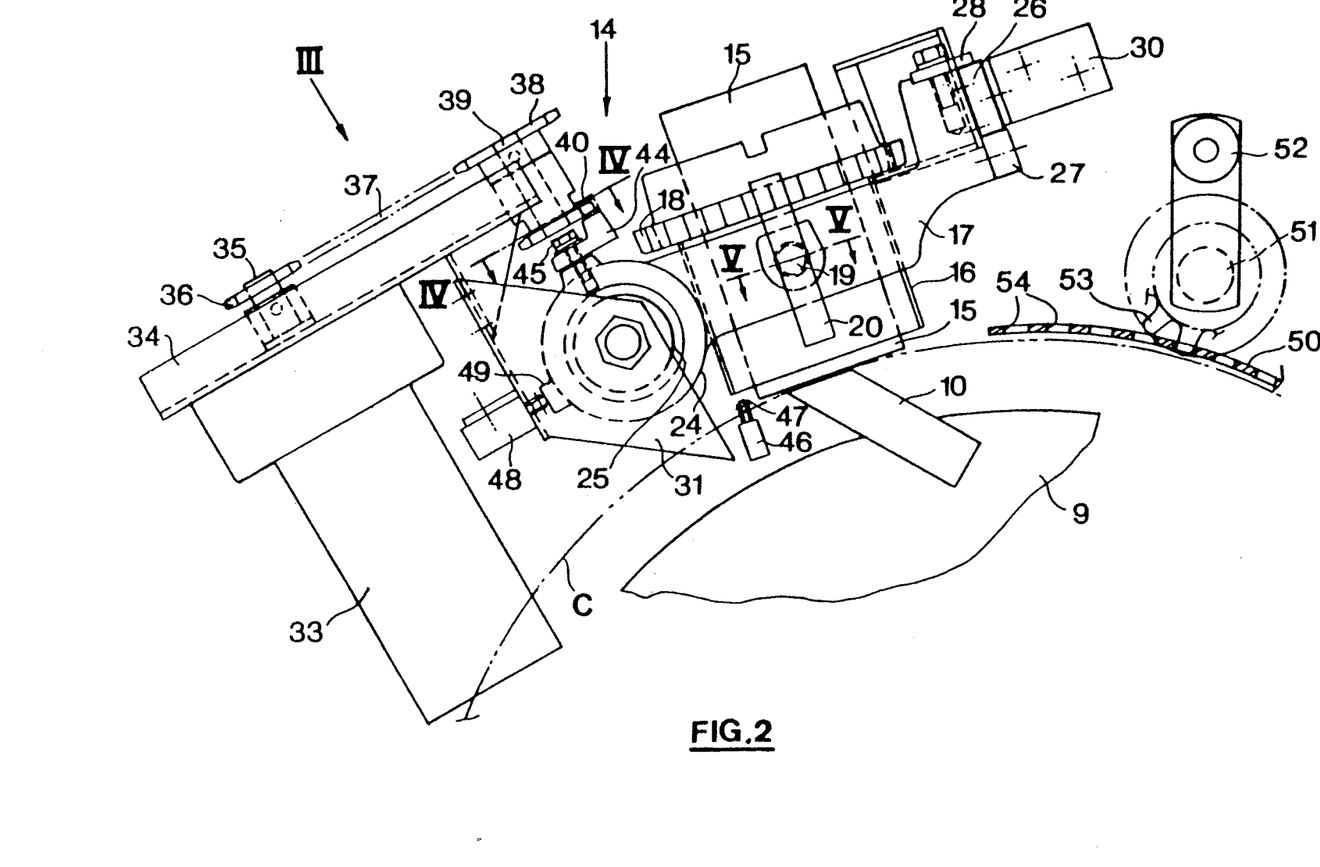
FIG. 2 is a diagrammatic side view of a mechanism for sharpening the knives of a forage harvester.

A DC motor 33 is mounted on a bracket 34 attached to one of the brackets 31 and an output shaft 35 of the motor carries a sprocket 36 which is connected via a chain 37 to a sprocket 38 mounted on a stub shaft 39 journalled in the bracket 34 and carrying a further sprocket 40 below the bracket 34. The sprocket 40 receives a chain 41 extending around a second sprocket 42 mounted on a stub shaft 43 journalled in a support bracket on the corresponding bracket 31. It will be seen that the chain 41 extends across the full width of the cutterhead 9, with the sprockets 40 and 42 being disposed outside the respective sidewalls 29 of the cutterhead housing and defining the extent of the two runs of the chain.

The chain 41 is coupled to the carriage 17 via a coupling member 44 which is a cast L-shaped member the outer end of one limb of which is attached between two links of the chain 41 with the other limb being pivotally attached to the collar 24 of the carriage 17. This pivotal attachment of the coupling 44 is by way of a bolt 45 and it should be noted that the pivot axis afforded by this bolt is substantially co-axial with the axis of rotation of the sprockets 40 and 42 when the carriage 17 is at one end or the other of a stroke. In the intermediate positions, the pivot axis afforded by the bolt 45 is parallel to the axes of rotation of the sprockets 40 and 42 and actually tracks or follows a line joining the centers of these two sprockets. This is a requirement because as the coupling 44 moves around sprockets 40, 42 when it reaches the same so as to undergo arcuate movement to move from one run of the chain 41 to another, bearing in mind that the chain moves continuously in the same direction, movement must not be imparted to the carriage 17 and lost motion is necessary. Once the coupling 44 has moved from one run of the chain 41 to the other, it again acts upon the carriage 17 and moves the latter back across the cutterhead 9 for its next grinding stroke.

An electrical stone switch 46 is disposed adjacent the lower end of the barrel 16 at the side of the machine at which the motor 33 is disposed, the switch having a plunger as an actuating member, the plunger being fitted with a roller 47 for engagement with the lower end of the barrel 16 when the latter is indexed towards the switch to an extent such that it can engage the roller. When this occurs, the stone switch 46 is opened and, as subsequently described with reference to FIG. 6A, causes an audible warning buzzer 150 as well as an optical warning light 168 to be actuated thereby indicating that the stone 15 needs replacement or readjusting relative to the barrel 16. When stone adjustment has to be carried out, the barrel 16 is rotated in a direction opposite to the indexing movement and the stone 15 is moved further into the barrel so as to expose a certain length of stone for further grinding operations.

A home/park electrical switch 48 is provided adjacent the collar 24 of the carriage 17 at the side of the machine at which the motor 33 is disposed and is actuated by an extension 49 on the collar. Each time the carriage 17 returns to the side of the machine at which the motor 33 is disposed, the home/park switch 48 is actuated and signals the control circuit of FIG. 6A, that the carriage is in its home position, out of the path of a door 50 as subsequently described.

Before a knife sharpening or grinding operation can be carried out, it is necessary first to remove part of the cutterhead housing so as to be able to gain access to the knives 10 of the cutterhead 9 with the grinding stone 15. The cutterhead housing comprises a slidable access door 50 (FIG. 2) which, in the embodiment shown, is slidable in an arcuate path relative to the remainder of the housing. Alternatively, access door 50 may be mounted for linear sliding movement relative to the remainder of the housing. In accordance with one aspect of the present invention, sliding movement is effected by a bi-directional door drive motor 100 (FIG. 6A) which drives a shaft 51. The shaft carries two sprockets or gear wheels 53 which engage respective series of slots 54 provided in the door 50. Thus, on rotation of the shaft 51 by the motor 100, the gears or sprockets 53 rotate but since the shaft 51 is held stationary, the teeth thereof engage the associated slots 54 and operate on the sides thereof to slide the door 50 relative to the remainder of the housing. An opening is thus created through which the stone 15 can gain access to the knives 10 of the cutterhead 9. It will be appreciated that once a grinding operation has been finished, the door 50 must be closed by rotating the shaft 51 in the opposite direction in order to reclose the cutterhead housing, thereby preventing crop material, dirt, etc. from being thrown therethrough. Also, access could be gained to the rotating cutterhead 9 which would be potentially extremely dangerous.

When the sharpener drive motor 33 is energized as subsequently explained with reference to FIG. 6A, the output shaft 35 is continuously rotated in one direction, whereby the sprocket 36 is driven in the same direction and thus drives the chain 37 continually. In turn, the sprocket 38 is driven by the chain 37 and this rotates the stub shaft 39 and hence the sprocket 40 mounted thereon. The sprocket 40 drives the chain 41 continuously and in the same direction with the sprocket 42 serving as an idler. As soon as the chain 41 is driven, it carries with it the coupling 44 and thus the carriage 17 is moved from the home or park position illustrated in FIG. 3, across the cutterhead 9 (to the left as seen in FIG. 3), whereupon the knives 10 engage the sharpening stone 15 (as the cutterhead rotates), whereby they are ground or sharpened. The carriage 17 continues to move across the cutterhead 9 until the coupling 44 reaches the sprocket 42 and it then has to pass therearound so as to move from one run of the chain to the other. As the coupling 44 is moving around the sprocket 42, no movement of the carriage 17 takes place as already explained but because the stone 15 is located outside of the cutterhead housing sidewall 29, there is no contact between the still rotating cutterhead knives 10 and the stone 15. As soon as the coupling 44 has traveled around the sprocket 43, it proceeds to move along the opposite run of the chain 41 and thus carries the carriage 17 back across the cutterhead 9 to its original position, again the knives 10 engaging the stone 15 during this return pass of the carriage. As the coupling 44 returns to the sprocket 40, the extension 49 on the carriage collar 24 actuates the switch 48 although this does not necessarily deenergize the motor 33 as will be explained later. The coupling 44 then proceeds to pass around the sprocket 40, assuming there is another pass of the stone to be made, the carriage 17 again pausing while this movement of the coupling around the sprocket 40 takes place. Thus the coupling 44 moves back to its original run of the chain 41 and then commences to take the carriage 17 back across the cutterhead 9, and so on. This continual movement of the grinding stone 15 back and forth across the cutterhead 9 continues until such time as the grinding operation is to be stopped.

When the carriage 17 undergoes the first described traverse across the cutterhead 9, the trip device 23 engages a tooth of the indexing ring 18 and thus rotates that ring through approximately one tooth width and hence indexes the stone barrel 16 so as to move the operative face of the stone 15 slightly closer to the cylinder described by the tips of the knives 10, the stone 15 traversing a line on the periphery of the cylinder substantially parallel to the axis of rotation of the cutterhead 9. This indexing operation occurs every time the carriage 17 moves to the left-hand side (as seen in FIG. 3 of the drawings), i.e., at the end of every two strokes of the grinding mechanism.

Figure 6A:
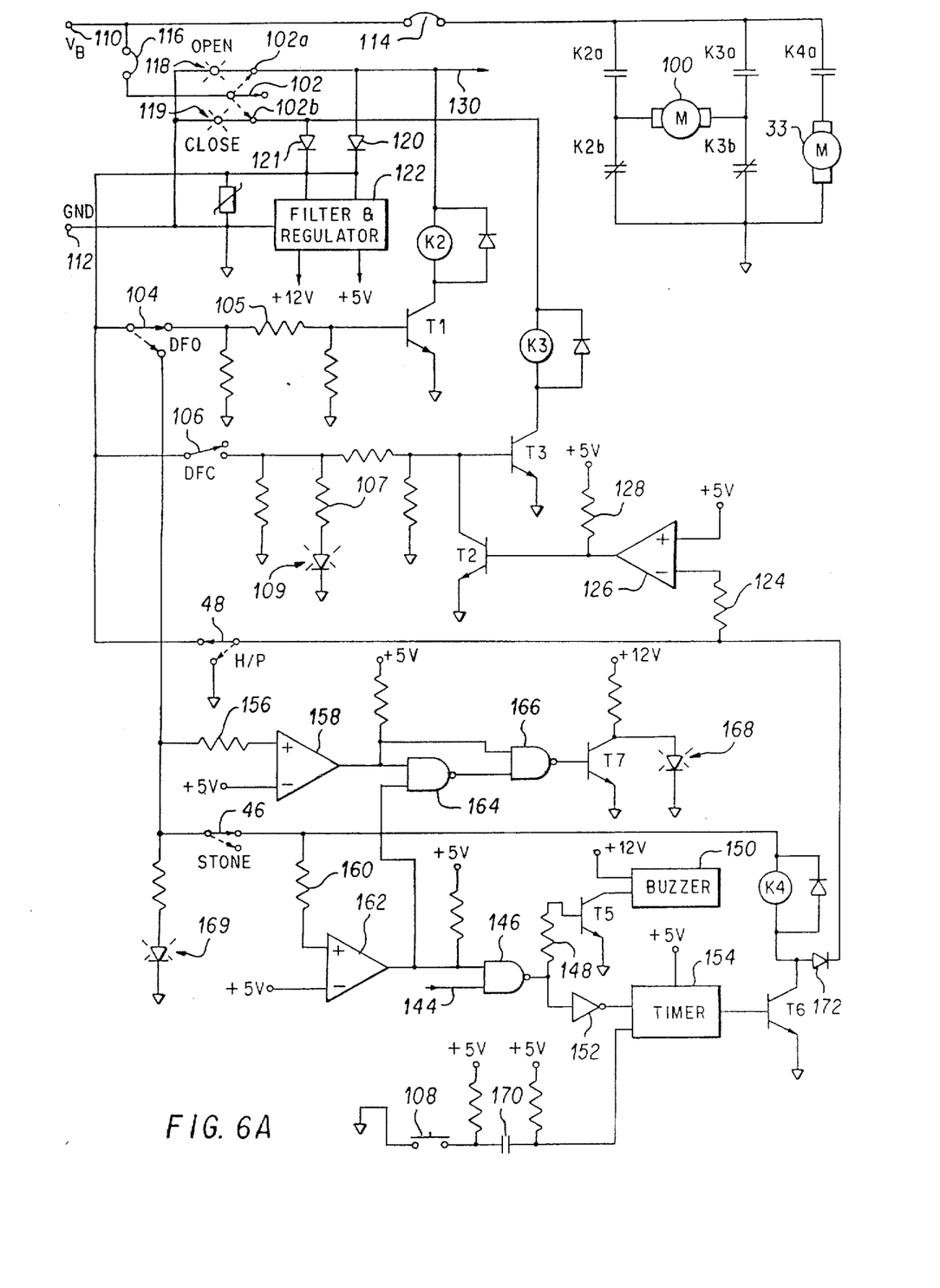
FIGS. 6A and 6B illustrate a circuit for automatically controlling a knife sharpening operation.
Figure 6B:
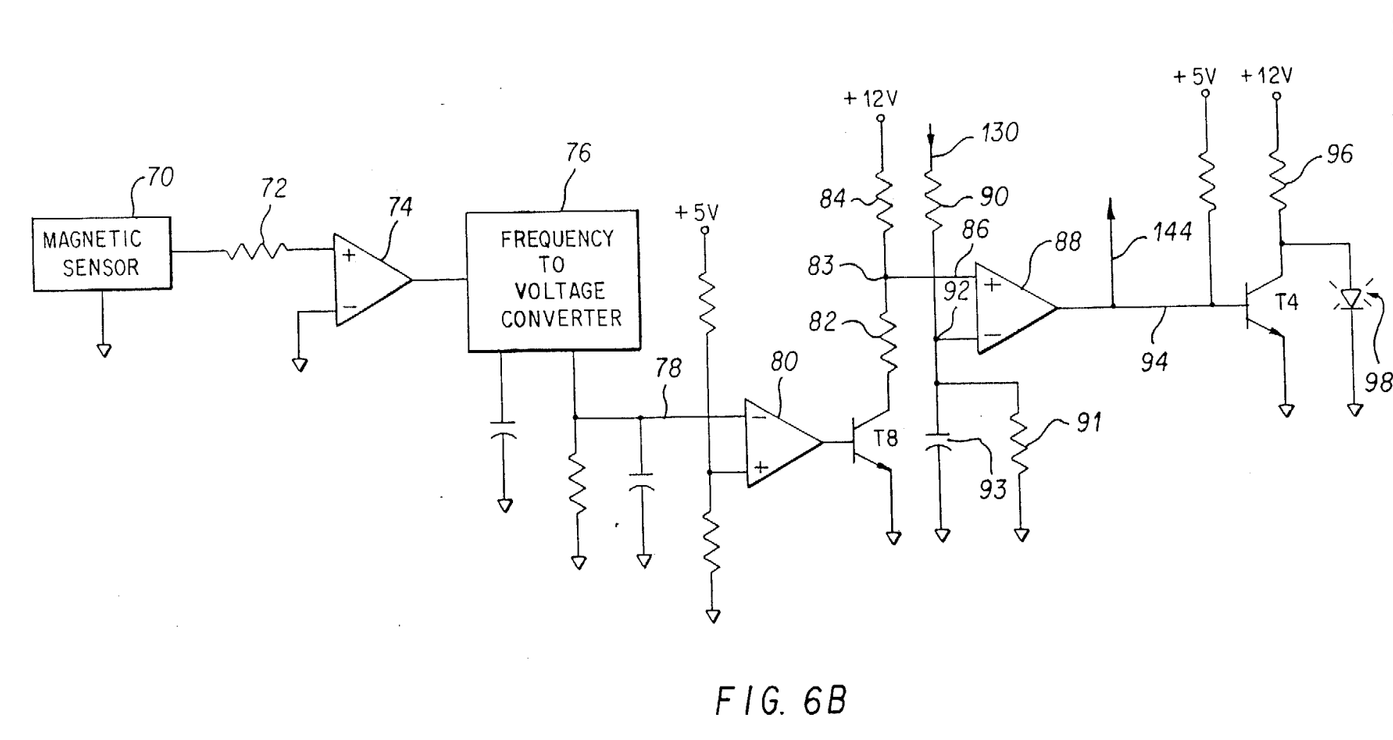

FIGS. 6A and 6B illustrate a control circuit which enables an operator to control all operations necessary for the sharpening of the cutterhead knives by operating switches on a control panel accessible from his driving position in the operator's cab 101. Since the time for sharpening the knives is fixed as subsequently explained, proper knife sharpening requires that the cutterhead be rotating at least at some predetermined minimum rate of rotation. As illustrated in FIG. 6B, a circuit for sensing cutterhead speed comprises a magnetic sensor 70 having an output connected through a resistor 72 to a amplifier 74. The output of the amplifier 74 is connected to the input of a frequency-to-voltage converter 76 and the output of the converter is connected by a lead 78 to one input of a comparator 80. The output of comparator 80 is connected to the base of a grounded emitter transistor T8 whose collector is connected to +12 V through a 3.9K resistor 82 and a 10K resistor 84. The junction 83 between resistors 82 and 84 is connected by a lead 86 to a comparator 88.

The sensor 70 may be a magnetic variable reluctance pickup, Hall-effect or similar device positioned adjacent the cutterhead so as to produce output pulses at a rate proportional to the rate of rotation of the cutterhead. These pulses are amplified by amplifier 74 and applied to the converter 76 which produces an output voltage on lead 78 proportional to frequency of the pulses produced by sensor 70. When the cutterhead is rotating at a speed at least as great as that required for proper knife sharpening, the voltage on lead 78 exceeds the voltage applied to the second input of comparator 80 and the output of the comparator drops to the logic 0 level thereby turning transistor T8 off. On the other hand, if the rate of rotation of the cutterhead is less than that required for proper knife sharpening the voltage on lead 78 is less than the voltage applied to the second input of comparator 80. In this case the comparator 80 produces a logic 1 signal to turn transistor T8 on.

The voltage at junction 83 is +12 V when transistor T8 is off and about +3.51 V when it is on. The effect of these voltages on comparator 88 depends on the voltage present on lead 130. This lead is connected through a switch 102. (FIG. 6A) to $V_B$ as subsequently explained. The lead 130 is connected through two 10K transistors 90 and 91 to ground with the junction 92 between the resistors being connected to a second input of comparator 88 and, through a capacitor 93, to ground. When $V_B$ is applied to lead 130 the junction point 92 is at about +6 V to +8 V, assuming that the unregulated harvester battery voltage $V_B$ is between +12 V and +16 V. On the other hand, when $V_B$ is not applied to lead 130 junction 92 is at ground.

The comparator 88 produces a logic 1 output signal when the voltage at junction 83 is greater than the voltage at junction 92. At all other times it produces a logic 0 output signal. Therefore, if $V_B$ is not being applied to lead 130 the comparator 88 produces a logic 1 output signal because the voltage at junction 83 is greater than the voltage at junction 92 regardless of the state of transistor T8. That is, the speed of the cutterhead does not affect the output of the comparator. However, if $V_B$ is being applied to comparator 88 then the comparator produces a logic 1 output signal only when the cutterhead speed is greater than some predetermined value so that the output voltage from converter 76 is high enough to cause comparator 80 to produce a logic 0 output signal thereby turning transistor T8 off.

The output of comparator 88 is applied over a lead 94 to the base of a grounded emitter transistor T4. The collector of this transistor is connected through a resistor 96 to +12 V and through an LED indicator 98 to ground. When comparator 88 produces a logic 1 output signal it turns transistor T4 on thereby extinguishing the LED 98. On the other hand, when the cutterhead speed is too low and comparator 88 produces a logic 0 output signal, transistor T4 is turned off and indicator 98 is turned on. The indicator is located on the operator's control panel and signals the operator that the cutterhead speed is too low to begin, or continue, a knife sharpening operation.

The output of comparator 88 is also connected by a lead 144 to a NAND 146 (FIG. 6A) and the signal on this lead blocks the NAND when the cutterhead speed is too low to begin, or continue, a knife sharpening operation.

Referring now to FIG. 6A, in addition to the sharpener drive motor 33, the home/park switch 48, the stone switch 46 and the bi-directional door drive motor 100 previously described, the circuit includes a power switch 102, a Door Fully Opened switch 104, a Door Fully Closed switch 106, a start sharpener switch 108 and three relays K2, K3 and K4 for controlling the door drive motor and knife sharpener motor.

The power switch 102 may be a rocker type 3-position manual switch having an open position where its operating contact contacts terminal 102a, a close position where its operating contact makes contact with terminal 102b, and a center "off" position. The terms "open" and "close" are used to designate the direction in which door 50 may be moved when the switch is in that position. When the switch is in the off position the entire control circuit is rendered inoperative. The power switch is located at a position such that it may be operated by the operator when he is seated at his driving position in the cab of the forage harvester.

The Door Fully Opened switch 104 is positioned such that when the door 50 is fully opened it actuates the switch. When the door is not fully opened the switch 104 is in the position shown in FIG. 6A.

The Door Fully Closed switch 106 assumes the position shown in FIG. 6A when the door 50 is fully closed. The switch 106 closes shortly (about 1 second) after the door begins moving from its fully closed position.

The control circuit receives an unregulated voltage via terminals 110 and 112 from a battery (not shown) which provides power to other electrical circuits of the forage harvester. The voltage $V_B$ at terminal 110 is connected through a circuit breaker 114 to the normally open relay contacts K2a, K3a and K4a associated with relays K2, K3 and K4, respectively. Terminal 110 is also connected through a second circuit breaker 116 to the operating contact of power switch 102.

When an operator wishes to sharpen the cutterhead knives, he operates power switch 102 so that the operating contact makes contact with switch terminal 102a. This establishes a first circuit through a first visual indicator 118 to ground. The indicator 118 is located on a console or control panel in the cab of the harvester and signals the operator that the switch 102 is in the door opening position. It may be positioned to back-light one side of the rocker switch 102.

$V_B$ is also applied from terminal 102a through a diode 120 to a filter and regulator circuit 122 which provides a filtered +12 V output and a regulated +5 V output. These voltages are distributed to various circuit elements in FIGS. 6A and 6B.

Closure of switch 102 through contact 102a applies the unregulated voltage $V_B$ through the diode 120 to switches 104, 106 and 48. From switch 104, $V_B$ is applied through a resistor 105 to the base of a transistor T1 to turn it on. A circuit is thus established from terminal 102a through the coil of relay K2 and the transistor T1 to ground to energize K2. As relay K2 is energized its contacts K2a close and its contacts K2b open. The bidirectional door drive motor 100 is energized by the circuit extending from terminal 110 through circuit breaker 114, contacts K2a, motor 100, and contacts K3b to ground. Current through the motor is in a direction such that the motor begins driving the door 50 toward its open position.

From contact 48, $V_B$ is applied through a resistor 124 to a first input of a comparator 126. The second input of the comparator is connected to +5 V. The output of the comparator is connected to the base of a transistor T2 and through a resistor 128 to +5 V. The emitter of transistor T2 is connected to ground and its collector is connected to the base of a transistor T3 which is connected in series with the coil of relay K3. When the voltage $V_B$ is applied to the first input of comparator 126, the output of the comparator drops to logic 0 thus turning transistor T2 off. However, since the Door Fully Closed switch 106 is still open at this time, transistor T3 is not turned on.

At the time the operating contact of power switch 102 makes contact with terminal 102a, the voltage $V_B$ at terminal 102a is applied over lead 130 to an input of comparator 88 (FIG. 6B). Assuming for the moment that the cutterhead is not rotating at least as fast as required for knife sharpening, the comparator produces a logic 0 output signal to turn off transistor T4 thereby energizing the low cutter speed indicator 98 as previously described.

The logic 0 output signal of comparator 88 is also applied over lead 144 to one input of NAND 146 (FIG. 6A) to block the NAND. The output of NAND 146 is applied through a resistor 148 to the base of a transistor T5. The transistor has a grounded emitter and a buzzer or audible alarm is connected in series with its collector. When NAND 146 is blocked, its logic 1 output turns on transistor T5 thereby energizing the buzzer 150. This alarm signals the operator that he should check the visual indicators to determine what action is required of him.

In addition to causing the energization of the audible alarm, the logic 1 output signal from NAND 146 is applied through an inverter 152 to a timer 154 to reset it. As subsequently explained, the timer 154 times the interval during which the sharpening stone is moved back and forth along the cutterhead to sharpen the knives.

About 1 second after the door motor 100 is energized to begin opening door 50, the Door Fully Closed switch 106 closes. When switch 106 closes, $V_B$ is applied through a resistor 107 to an LED 109. This lights the LED to warn the operator that the door 50 is not fully closed. The closing of switch 106 also applies $V_B$ to the base of transistor T3 to turn it on. Since the operating contact of switch 102 is still making contact with terminal 102a, the series circuit including transistor T3 and relay K3 is open at the switch and relay K3 is not energized even though the transistor is on.

The motor 100 remains energized and continues to drive door 50 toward its fully opened position. As the door reaches its fully opened position, it operates the switch 104 so that $V_B$ is no longer applied to the base of transistor T1. The transistor turns off thereby deenergizing the coil of relay K2. The relay contacts K2b close and the contacts K2a open to deenergize the door drive motor 100.

When the switch 104 is operated, $V_B$ is applied through the switch and a resistor 156 to one input of a comparator 158. $V_B$ is also applied through stone switch 46 to the coil of relay K4, and through a resistor 160 to one input of a comparator 162. Relay K4 is not energized at this time since it is connected in series with a transistor T6 which is off because of a logic 0 output signal from timer 154. However, comparators 158 and 162 both produce logic 1 output signals. The output of comparator 162 enables one input of NANDs 146 and 164 while the output of comparator 158 enables one input of NANDs 164 and 166. With both inputs enabled, NAND 164 produces a logic 0 output signal to block NAND 166. The output signal from NAND 166 turns transistor T7 on. This transistor is connected in parallel with an LED 168 so that the LED is extinguished when the transistor is turned on. This LED is turned on as subsequently described to warn the operator when the sharpener stone requires adjustment or replacement.

When the door 50 is fully opened to actuate switch 104, $V_B$ is applied through the switch to an LED 169. This LED signals the operator that the door 50 is fully opened.

If the operator has not brought the cutterhead up to the predetermined minimum rate of rotation necessary for proper knife sharpening, the signal on lead 144 is still at the logic 0 level so that the buzzer 150 is still sounding. The LED 98 (FIG. 6B) is still on. These conditions tell the operator that he must increase the speed of the cutterhead. Under these conditions the logic 1 output signal from comparator 162 has no effect on the output signal from NAND 146 and the buzzer 150 continues to sound. Nothing further happens in the control circuit until the operator does bring the cutterhead up to speed in a conventional manner by increasing the engine speed of the forage harvester and engaging a clutch in the drive train from the engine to the cutterhead.

When both input signals to NAND 146 are logic 1, that is, when the cutterhead is up to speed and $V_B$ is applied to comparator 162, the NAND produces a logic 0 output signal. This signal turns transistor T5 off thereby disabling the buzzer 150. The output signal from NAND 146 is inverted by inverter 152 and applied to the timer 154 to enable it.

Timer 154 times the duration of the interval that the grinding stone is applied to the knives of the cutterhead. It may be a fixed timer for timing a fixed interval on the order of 3 minutes or it may be a selectable interval timer in which case a control switch may be provided on the operator's console so that the operator may manually select the timing interval.

After timer 154 is enabled by the output signal from inverter 152, the control circuit maintains its status awaiting further action by the operator. The operator knows that action is required on his part because the Door Fully Open indicator 169 is lit and the buzzer 150 is not sounding. Normally, this action is the operation of the start sharpener switch 108. This switch is located on the operator's control panel and is connected in series with a capacitor 170 between ground and an input to timer 154. When the operator actuates switch 108, a negative-going pulse is applied to timer 154 to initiate its timing interval. At this time the timer produces an output signal which turns on transistor T6. The coil of relay K4 is thus energized by a circuit extending from terminal 110 through circuit breaker 116, switch 102, diode 120, switches 104 and 46, the coil of relay K4 and transistor T6 to ground. When relay K4 is energized, its contacts K4a are closed. A circuit is established from terminal 110 through circuit breaker 114, relay contacts K4a and the knife sharpener drive motor 33 to ground. The motor 33 begins driving the sharpening stone through the mechanism previously described to sharpen the knives of the cutterhead.

As soon as the motor 33 moves the sharpening stone away from its home/park position, movement of the stone switches the home/park switch 48 so that its operating contact is connected to ground. This accomplishes two things. First, the ground level signal is applied through resistor 124 to comparator 126 thereby causing the output of the comparator to rise to the logic 1 level. Transistor T2 is turned on thereby turning transistor T3 off. This insures that the door 50 will not be closed on the grinding stone while it is away from its home/park position even though the operator may inadvertently switch the switch 102 to its "close door" position.

Secondly, by connecting the operating contact of switch 48 to ground, K4 is provided with a second circuit to ground through a diode 172, this circuit being in parallel with transistor T6. The purpose of this parallel circuit is to insure that the sharpening stone is returned to its home/park position in the event that the sharpening stone is away from its home position, and thus in the path of door 50, when the timer 154 times out and turns transistor T6 off.

Figure 1:
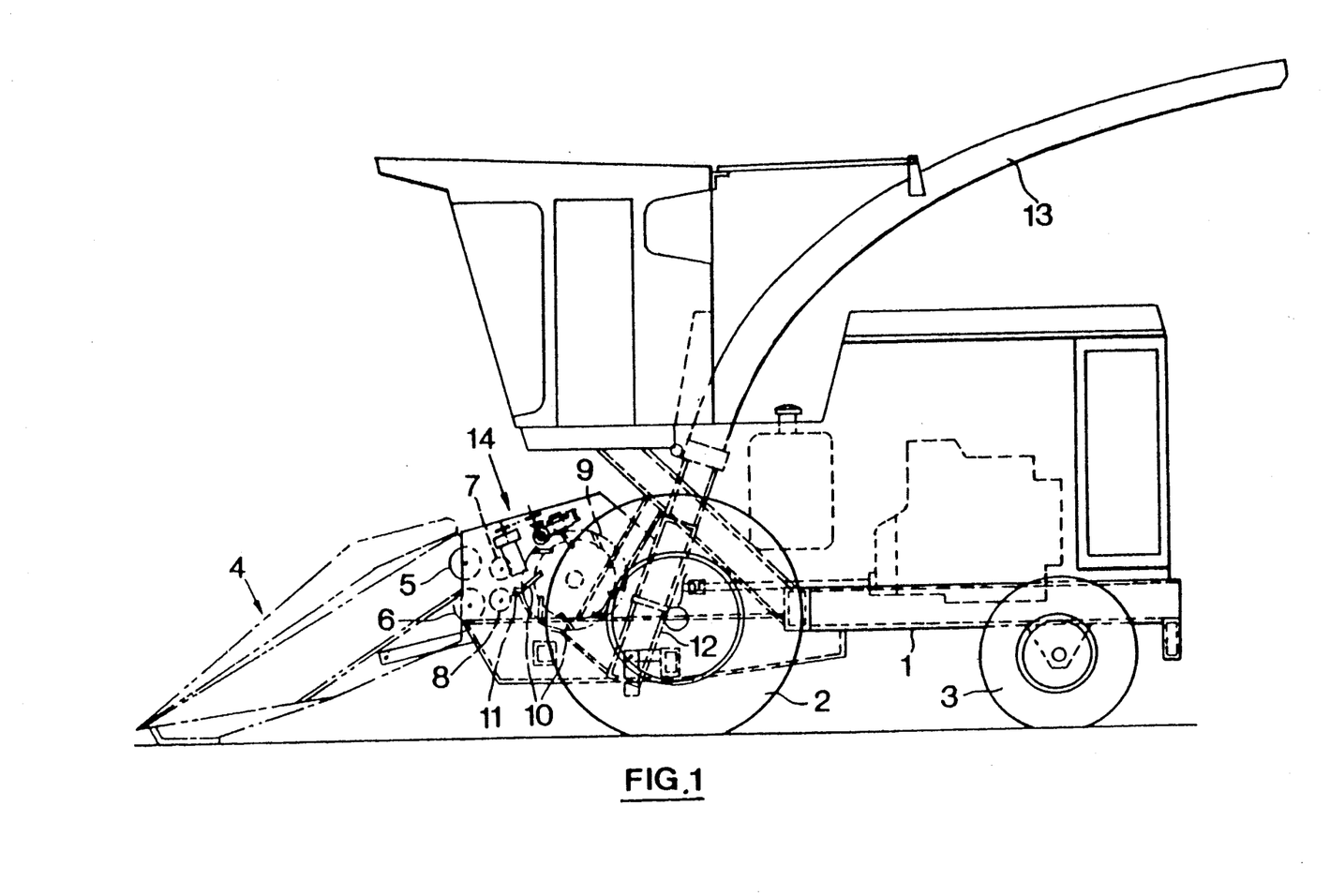
FIG. 1 is a diagrammatic side view of a forage harvester in which the invention is embodied.

During a full or complete knife sharpening cycle the sharpener drive motor repeatedly drives the sharpening stone back and forth as described with reference to FIGS. 1–3 and this action continues until timer 154 times out. The timer then produces an output signal to turn transistor T6 off. If the sharpening stone is at its home/park position when transistor T6 is turned off, relay K4 is deenergized and its contacts K4a open so that the sharpener drive motor 33 stops. On the other hand, if the sharpening stone is not at its home/park position when transistor T6 is turned off, a circuit exists from relay K4 through diode 172 and the home/park switch 48 to ground so that relay K4, and thus sharpener drive motor 33, remains energized. The sharpener drive motor continues driving the sharpening stone until the stone reaches its home/park position and the switch 48 returns to the solid-line position shown in FIG. 6A. When this happens, there is no longer a path to ground through the coil of relay K4 and the relay is deenergized. Its contacts K4a open thereby deenergizing the sharpener drive motor 33.

When the home/park switch returns to the position shown in FIG. 6A, $V_B$ is again applied to comparator 126, the output from the comparator turns transistor T2 off, and transistor T3 is turned on as previously described.

If, during the interval being tolled by timer 154, the speed of the cutterhead should drop below the minimum speed required for proper knife sharpening, the timer is reset and the sharpening stone is returned to its home/park position. In FIG. 6B, when the cutterhead speed drops below the critical speed, the output from comparator 80 turns transistor T8 on and the resulting voltage at junction 83 causes comparator 88 to produce a logic 0 output signal. This signal turns transistor T4 off so that the Low Cutterhead Speed indicator 98 is turned on. The logic 0 output signal of comparator 88 blocks NAND 146 thereby turning transistor T5 on to sound buzzer 150.

The output of NAND 146 also resets timer 154 and the output signal from the timer turns transistor T6 off. If the sharpening stone is in its home position, $V_B$ is applied to both sides of relay K4 through switches 46 and 48. The relay drops out and its contacts open the energizing circuit for the sharpener drive motor 33. If the sharpening stone is not in its home position, ground is applied through switch 48 to one side of relay K4 while $V_B$ is applied through switch 46 to the other side. In this case, relay K4 and thus motor 33 remain energized until the sharpening stone is driven to its home position. When the stone reaches its home position it operates switch 48 so that $V_B$ is now applied to both sides of relay K4, thereby deenergizing the relay and the motor 33.

If, during the interval being tolled by timer 154, the stone switch 46 is actuated, indicating that the sharpening stone needs adjustment or replacement, the LED indicator 168 is turned on, buzzer 150 is turned on, timer 154 is reset and the sharpener drive motor 33 is turned off. When stone switch 46 is actuated it removes $V_B$ from relay K4. The relay drops out and its contacts K4a open so that the drive motor 33 is deenergized.

If the sharpening stone is not in its home/park position, the operator must attend to the problem with the stone before he can initiate closure of the access door 50. Comparator 126 will be connected to ground through the home/park switch 48 so that the comparator produces a logic 1 output signal that turns transistor T2 on. This connects the base of transistor T3 to ground thus turning the transistor T3 off. This opens the energizing circuit for the door closure relay K3 thereby preventing energization of the door drive motor 100 in a direction which closes the door.

When switch 46 opens, the output of comparator 162 drops to the logic 0 level. The output from comparator 162 blocks NANDs 146 and 164. The output from NAND 164 enables one input of NAND 166 while the other input of NAND 166 is enabled by the logic 1 output of comparator 158. NAND 166 therefore produces a logic 0 output to turn transistor T7 off thereby energizing the Stone Replace/Adjust indicator 168.

When the output of comparator 162 blocks NAND 146, the NAND produces a logic 1 signal to turn on transistor T5 and sound buzzer 150. The output of NAND 146 also acts through inverter 152 to reset timer 154.

Assume now that a knife sharpening cycle has been completed and the operator wishes to close the access door 50. Door closure is initiated when the operator switches the power switch 102 so that its operating contact makes contact with terminal 102b. As the operating contact moves away from terminal 102a to the center or off position of the switch, it removes $V_B$ from the entire circuit including the filter and regulator circuit 122. This terminates the +5 V and +12 V voltages which are distributed to various circuit elements. With all power removed all indicators are turned off.

When the operating contact of switch 102 makes contact with terminal 102b several things happen. $V_B$ is again applied to filter and regulator circuit 122 so that it again produces the voltages +12 V and +5 V. $V_B$ is applied to the Close indicator 119 associated with switch 102 to back light one side of the switch rocker arm thereby providing the operator with an indication of the switch position. $V_B$ is applied through switch 48 to comparator 126 and the output of the comparator turns transistor T2 off. $V_B$ is applied through switch 106 (still closed) to energize the Door Not Fully Closed indicator 109 and turn transistor T3 on. When transistor T3 is turned on, a circuit extends from terminal 110 through circuit breaker 116, switch 102, the coil of relay K3 and transistor T3 thus energizing the relay. As the relay is energized its contacts K3a close and its contacts K3b open. This establishes a circuit from terminal 110 through circuit breaker 114, contacts K3a, motor 100 and contacts K2b to ground. The door drive motor 100 is thus energized with current flow through the motor being such that the motor rotates in the direction to close door 50.

As the door 50 moves away from its fully open position, the switch 104 returns to the position (solid line) illustrated in FIG. 6A. This terminates the application of $V_B$ to the Door Fully Open indicator 169. It also terminates application of $V_B$ to relay K4 thereby insuring that the relay, and thus the sharpener drive motor 33 controlled by it, cannot be energized since energization of the motor 33 when the door is not fully opened will result in collision of the sharpening stone and the door. Actuation of switch 104 again causes $V_B$ to turn on transistor T1 but relay K2 cannot be energized since the circuit for energizing it is open at terminal 102a.

As switch 104 returns to its solid line position shown in FIG. 6A, it also terminates the application of $V_B$ to comparators 158 and 162 so that the outputs of the comparators drop to the logic 0 level. The output of comparator 158 blocks NAND 166 thereby turning transistor T7 on. This insures that the Stone Adjust/Replace indicator 168 is off.

The logic 0 output of comparator 162 blocks NAND 146 so that transistor T5 is turned on to energize the buzzer 150.

It should be noted that the Cutterhead Speed Low indicator 98 is disabled at the time the operating contact of switch 102 is switched away from the terminal 102a for the reason described above. Therefore this indicator will not be energized even though the cutterhead speed may drop below the minimum speed required for proper knife sharpening but this is of no consequence since knife sharpening cannot take place when the operating contact of switch 102 is in the off position or is making contact with terminal 102b.

The door drive motor 100 continues driving door 50 until the door reaches its fully closed position. When the door reaches this position it opens switch 106 thereby removing $V_B$ from the Door Not Closed indicator 109 and transistor T3. The indicator and transistor are both turned off. With transistor T3 off, the circuit for energizing relay K3 is opened. The relay drops out thus opening contacts K3a and closing contacts K3b. This deenergizes the door drive motor 100.

This completes the knife sharpening sequence and the operator may now switch the operating contact of switch 102 to its center or off position. This deenergizes indicator 119 and removes all power from the circuit thereby deenergizing indicator 119 and the buzzer 150.

It should be evident from the foregoing description that the operator may interrupt or terminate the knife sharpening operation at any time by operating the switch 102. When the switch 102 is set to its off position, the switches 104, 106, 46 and 48 in effect store the mechanical status of the knife sharpening system so that proper action may be taken when the switch is subsequently set to its open or close position. If switch 102 is switched off while the door 50 is being opened, subsequent switching of its operating contact to the open position will cause the door opening operation to resume. In like manner, if switch 102 is switched off while door 50 is being closed, subsequent switching of the switch back to its closed position will cause resumption of the door closing operation. If switch 102 is turned off while knife sharpening is taking place, i.e. while sharpener motor 33 is energized, subsequent switching of switch 102 back to its open position causes the sharpener drive motor 33 to be energized to drive the sharpener stone back to its home/park position if it is not already in that position, and the motor is then deenergized. The manner in which the circuit of FIG. 6A accomplishes these operations is evident from the foregoing description and further specific description of the circuit operation for each condition is deemed unnecessary.

From the foregoing description it is seen that the present invention provides a novel method and apparatus for accomplishing the sharpening of cutterhead knives. The sharpening may be accomplished under the control of an operator while he is seated in his driving position and the sharpening operation is carried out only when the cutterhead is rotating at a speed sufficient to accomplish proper knife sharpening. The mechanical and electrical elements are interlocked such that operations may be resumed after an interruption of the power to the electrical elements.

While a preferred embodiment of the invention has been described in specific detail, it will be understood that various modifications and substitutions may be made in the described embodiment without departing from the spirit and scope of the invention as defined in the appended claims. For example, the logic may be embodied in a microprocessor or discrete logic circuits.

The embodiments of the invention in which an exclusive property or privilege is claimed are defined as follows.

We claim:

1. A method of controlling knife sharpening in a forage harvester having a rotatable cutterhead carrying knives, a sharpening stone driven by a sharpener drive motor for sharpening the knives, and a control circuit for energizing said drive motor for a fixed interval of time to drive said sharpening stone adjacent said knives to sharpen them, said method comprising:
   sensing the rate of rotation of said cutterhead; and,
   inhibiting the energization of said drive motor by the control circuit when the rate of rotation of said cutterhead is less than the rate of rotation necessary for proper sharpening of said knives during said fixed interval of time.

2. Apparatus for controlling knife sharpening in a forage harvester having a rotatable cutterhead carrying knives, a sharpening stone driven by a sharpener drive motor for sharpening the knives, and a control circuit for energizing said drive motor for a fixed interval of time to drive said sharpening stone adjacent said knives to sharpen them, said apparatus being characterized by:
   sensing means for sensing the rate of rotation of said cutterhead; and
   means responsive to said sensing means for inhibiting the energization of said drive motor by the control circuit when the rate of rotation of said cutterhead is less than the rate of rotation necessary for proper sharpening of said knives during said fixed interval of time.

3. Apparatus as claimed in claim 1 wherein said control circuit comprises a timer producing first output signal for a fixed interval of time and a switching means actuated by said first output signal for connecting a source of power to said sharpener drive motor.

4. Apparatus as claimed in claim 3 wherein said means responsive to said sensing means comprises a frequency-to-voltage converter and means responsive to said frequency-to-voltage converter for resetting said timer to terminate said first output signal.

5. Apparatus as claimed in claim 4 and further comprising alternate circuit means, including a home/park switch, for actuating said switching means, said home/park switch being actuated by said sharpening stone when said sharpening stone reaches a home/park position to thereby inhibit actuation of said switching means by said alternate circuit means, whereby said alternate circuit means continues to energize said switching means until said home/park switch senses that said sharpening stone is in said home/park position even though said first output signal has been terminated.

6. Apparatus as claimed in claim 4 and further comprising an audible alarm responsive to said frequency-to-voltage converter for alerting an operator.

7. Apparatus as claimed in claim 4 and further comprising a visual indicator and means responsive to said frequency-to-voltage converter for indicating to an operator that the cutterhead rate of rotation is less than the rate of rotation necessary for proper sharpening of said knives during said fixed interval of time.

8. Apparatus as claimed in claim 3 and including a manually actuated switch for initiating operation of said timer to produce said first output signal, said means for inhibiting the energization of said drive motor including means for inhibiting initiation of timer operation even though said manually actuated switch is actuated.

9. A method of controlling cutterhead sharpening in a forage harvester having a rotatable cutterhead, means for sharpening the cutterhead, and a control circuit for energizing and sharpening means to a fixed interval of time, said method comprising:
   sensing the rate of rotation of said cutterhead; and,
   inhibiting the energization of said sharpening means by the control circuit when the rate of rotation of said cutterhead is less than the rate of rotation necessary for proper sharpening of said cutterhead during said fixed interval of time.

10. Apparatus for controlling cutterhead sharpening in a forage harvester having a rotatable cutterhead, means for sharpening the cutterhead, and a control circuit for energizing said sharpening means for a fixed interval of time, said apparatus comprising:
   sensing means for sensing the rate of rotation of said cutterhead; and,
   means responsive to said sensing means for inhibiting the energization of said sharpening means by the control circuit when the rate of rotation of said cutterhead is less than the rate of rotation necessary for proper sharpening of said cutterhead during said fixed interval of time.

* * * * *

UNITED STATES PATENT AND TRADEMARK OFFICE
CERTIFICATE OF CORRECTION

PATENT NO. : 4,991,476

DATED : Feb. 12, 1991

INVENTOR(S) : Mark K. Chow; John R. McClure

It is certified that error appears in the above-identified patent and that said Letters Patent is hereby corrected as shown below:

Column 13, line 46, cancel "1" and insert --2--.

Column 13, line 59, cancel "2" and insert --1--.

Column 14, line 8, after "producing" insert --a--.

Column 14, line 46, cancel "and" and insert --said--.

Column 14, line 46, cancel "to" and insert --for--.

Add drawing figures 4, 5, 6A and 6B as appended hereto.

Signed and Sealed this

Twentieth Day of April, 1993

Attest:

MICHAEL K. KIRK

*Attesting Officer*  *Acting Commissioner of Patents and Trademarks*